(12) United States Patent
Riordan

(10) Patent No.: US 8,261,346 B2
(45) Date of Patent: Sep. 4, 2012

(54) DETECTING ATTACKS ON A DATA COMMUNICATION NETWORK

(75) Inventor: James F. Riordan, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 12/128,834

(22) Filed: May 29, 2008

(65) Prior Publication Data

US 2009/0070870 A1    Mar. 12, 2009

(51) Int. Cl.
*G06F 11/00* (2006.01)
*G06F 12/14* (2006.01)
*G06F 12/16* (2006.01)
*G08B 23/00* (2006.01)

(52) U.S. Cl. ............. 726/22; 726/23; 726/24; 726/25; 726/26; 713/153; 713/154; 713/176; 713/177; 705/52

(58) Field of Classification Search ............. 726/22
See application file for complete search history.

(56) References Cited

U.S. PATENT DOCUMENTS

| | | | | |
|---|---|---|---|---|
| 5,440,723 | A * | 8/1995 | Arnold et al. | 714/2 |
| 6,473,405 | B2 * | 10/2002 | Ricciulli | 370/238 |
| 2002/0116639 | A1 * | 8/2002 | Chefalas et al. | 713/201 |
| 2002/0156898 | A1 | 10/2002 | Poirier et al. | |
| 2002/0166063 | A1 * | 11/2002 | Lachman et al. | 713/200 |
| 2004/0025044 | A1 * | 2/2004 | Day | 713/200 |
| 2004/0117478 | A1 * | 6/2004 | Triulzi et al. | 709/224 |
| 2004/0148521 | A1 * | 7/2004 | Cohen et al. | 713/201 |
| 2004/0162994 | A1 * | 8/2004 | Cohen et al. | 713/201 |

FOREIGN PATENT DOCUMENTS

| | | |
|---|---|---|
| WO | WO 02/03653 A2 | 1/2002 |
| WO | WO 02/061510 A2 | 8/2002 |
| WO | WO 02/086724 A1 | 10/2002 |
| WO | WO 03/050644 A2 * | 6/2003 |

OTHER PUBLICATIONS

Weiler, N. 2002. Honeypots for Distributed Denial of Service Attacks. In Proceedings of the 11th IEEE international Workshops on Enabling Technologies: Nfrastructure for Collaborative Enterprises (Jun. 10-12, 2002). WETICE. IEEE Computer Society, Washington, DC, 109-114.*
"Honeypots: Sticking it to Hackers," Lance Spitzner, Network Magazine, Apr. 2003, pp. 48-51.

* cited by examiner

*Primary Examiner* — Nathan Flynn
*Assistant Examiner* — Bryan Wright
(74) *Attorney, Agent, or Firm* — Michael J. Buchenhorner; Vazken Alexanian

(57) ABSTRACT

Described is a technique for detecting attacks on a data communications network having a plurality of addresses for assignment to data processing systems in the network. The technique involves identifying data traffic on the network originating at any assigned address and addressed to any unassigned address. Any data traffic so identified is inspected for data indicative of an attack. On detection of data indicative of an attack, an alert signal is generated.

9 Claims, 4 Drawing Sheets

DETECTING ATTACKS ON A DATA COMMUNICATION NETWORK

TECHNICAL FIELD

The present invention generally relates to detecting network attacks and particularly relates to methods, apparatus, and computer program elements for detecting attacks on a data communications network

BACKGROUND OF THE INVENTION

The Internet is a wide area data communications network formed from a plurality of interconnected data networks. In operation, the Internet facilitates data communications between a range of remotely situated data processing systems. Such data processing systems each typically comprise a central processing unit (CPU), a memory subsystem, and input/output (I/O) subsystem, and computer program code stored in the memory subsystem for execution by the CPU. Typically, end user data processing systems connected to the Internet are referred to as client data processing systems or simply clients. Similarly, data processing systems hosting web sites and services for access by end users via the Internet are referred to as server data processing systems or simply servers. There is a client-server relationship completed via the Internet between the end user data processing systems and the hosting data processing systems.

The Internet has become an important communications network for facilitating electronically effected commercial interactions between consumers, retailers, and service providers. Access to the Internet is typically provided to such entities via an Internet Service Provider (ISP). Each ISP typically operates an open network to which clients subscribe. Each client is provided with a unique Internet Protocol (IP) address on the network. Similarly, each server on the network is provided with a unique IP address. The network operated by the ISP is connected to the Internet via a dedicated data processing system usually referred to as a router. In operation, the router directs inbound communication traffic from the Internet to specified IP addresses on the network. Similarly, the router directs outbound communication traffic from the network in the direction of specified IP addresses on the Internet.

A problem faced by many ISPs is the increasing frequency of electronic attacks to the networks they operate. Such attacks include computer virus attacks and so-called "worm" attacks. Attacks of this nature introduce significant performance degradation in networks operated by ISPs. Infected systems connected to the network typically attempt to spread the infection within the network. Many users do not recognize that their systems are infected. It would be desirable to provide technology for triggering disinfection of such systems in the interests of increasing network performance.

SUMMARY OF THE INVENTION

In accordance with the present invention, there is now provided a method for detecting attacks on a data communications network having a plurality of addresses for assignment to data processing systems in the network, the method comprising: identifying data traffic on the network originating at any assigned address and addressed to any unassigned address; inspecting any data traffic so identified for data indicative of an attack; and, on detection of data indicative of an attack, generating an alert signal.

The term "unassigned" herein is meant as covering an address that is not assigned to a physical device other than an apparatus for detecting an intrusion or generating an attack signature. The apparatus that is designed to execute the method according to the invention will be the device those "unassigned" addresses are actually assigned to in order to make use of the invention. Those addresses are insofar unassigned as they are not assigned to any device that does have another functionality apart from signature generation or intrusion detection. Thereby data traffic that is addressed to such an unassigned address will be received by that apparatus and subjected to the claimed method.

The inspecting preferably comprises spoofing replies to requests contained in the data traffic identified. A preferred embodiment of the present invention comprises, on generation of the alert signal, rerouting any data traffic originating at the address assigned to the data processing system originating the data indicative of the attack to a disinfection address on the network. On generation of the alert signal, an alert message may be sent to the disinfection address. The alert message may comprise data indicative of the attack detected. On receipt of the alert message, a warning message may be sent from the disinfection address to the address assigned to the data processing system originating the data indicative of the attack. The warning message may include program code for eliminating the attack when executed by the data processing system originating the data indicative of the attack.

Viewing the present invention from another aspect, there is now provided apparatus for detecting attacks on a data communications network having a plurality of addresses for assignment to data processing systems in the network, the apparatus comprising: an intrusion detection sensor (IDS) for identifying data traffic on the network originating at any assigned address and addressed to any unassigned address, inspecting any data traffic so identified for data indicative of an attack, and, on detection of data indicative of an attack, generating an alert signal.

The IDS in use preferably inspects the data traffic identified through spoofing replies to requests contained in the data traffic identified. The apparatus may also comprise a router connected to the intrusion detection sensor for rerouting, in response to generation of the alert signal, any data traffic originating at the address assigned to the data processing system originating the data indicative of the attack to a disinfection address on the network. Preferably, the IDS, on generation of the alert signal, sends an alert message to the disinfection address. The alert message preferably comprises data indicative of the attack detected. A preferred embodiment of the present invention further comprises a disinfection server assigned to the disinfection address, the disinfection server sending, on receipt of the alert message, a warning message to the address assigned to the data processing system originating the data indicative of the attack.

The present invention also extends to a data communications network comprising: a plurality of addresses for assignment to data processing systems in the network; and, apparatus for detecting attacks on the network as herein before described.

The present invention further extends to a computer program element comprising computer program code means which, when loaded in a processor of a data processing system, configures the processor to perform a method for detecting attacks on a data communications network as herein before described.

In a preferred embodiment of the present invention, there is provided a data communications network comprising: a router for connecting a plurality of data processing systems to the Internet; an IDS connected to the router; and a disinfection server also connected to the router. In response to the IDS detecting that one of the data processing systems is infected by an attack, the IDS instructs the router to deflect all network traffic from that attack to the disinfection server. The IDS simultaneously supplies disinfection data to the disinfection server. The disinfection data is indicative of: the nature of the infection; how to disinfect the infecting system; and how to resume normal network connectivity.

There are generally a large number of free IP addresses on a given network. In a particularly preferred embodiment of the present invention, the IDS listens on the network for traffic directed toward the free IP addresses. No such traffic should exist. In the event that a request sent to one of the free IP addresses is detected, the IDS spoofs an answer to the request. The free IP addresses are not in use. Thus, any attempt to contact, for example, a server at such an address is a priori suspicious. The IDS then listens for a reply to the spoofed answer. It the IDS detects a diagnosable attack in the reply, it signals the router to divert all traffic from the infected system to the disinfection server. Because, the IDS is interactively spoofing responses to infected systems, it has an accurate view of each attack. Thus, false positives are minimized.

BRIEF DESCRIPTION OF THE FIGURES

Preferred embodiments of the present invention will now be described, by way of example only, with reference to the accompanying drawings, in which.

DETAILED DESCRIPTION

Figure 1:
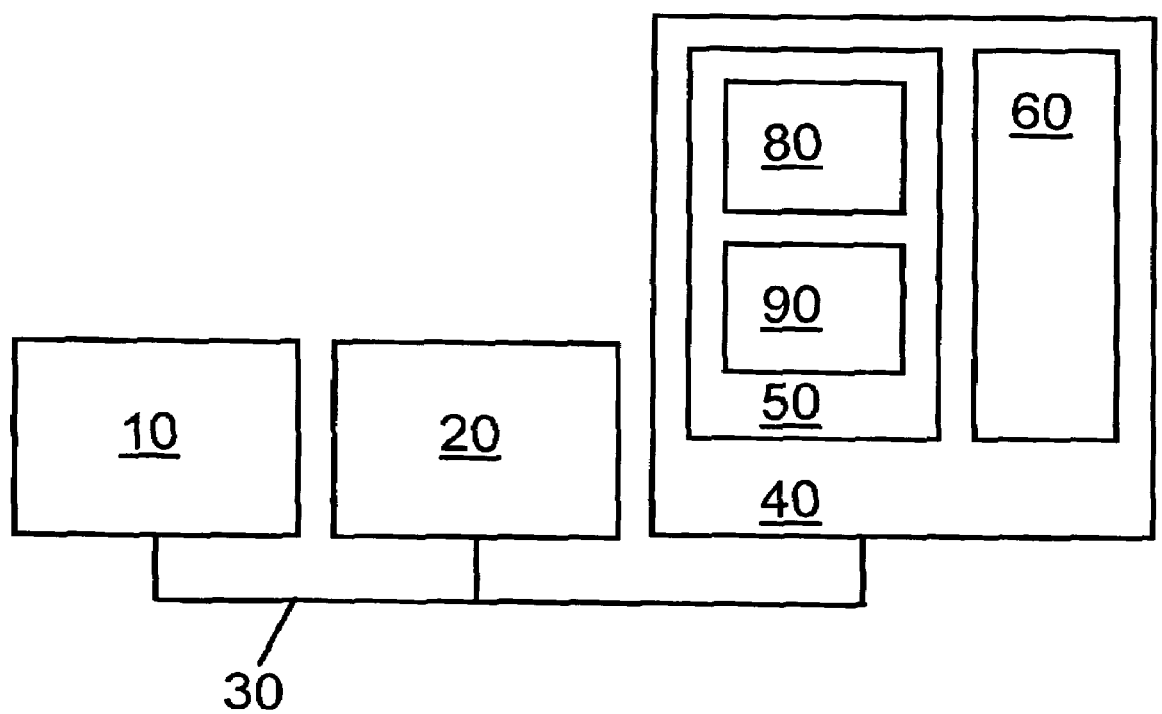
FIG. 1 is a block diagram of a data processing system.

Referring first to FIG. 1, a data processing system comprises a CPU 10, an I/O subsystem 20, and a memory subsystem 40, all interconnected by a bus subsystem 30. The memory subsystem 40 may comprise random access memory (RAM), read only memory (ROM), and one or more data storage devices such as hard disk drives, optical disk drives, and the like. The I/O subsystem 20 may comprise: a display; a printer; a keyboard; a pointing device such as a mouse, tracker ball, or the like; and one or more network connections permitting communications between the data processing system and one or more similar systems and/or peripheral devices via a data communications network. The combination of such systems and devices interconnected by such a network may itself form a distributed data processing system. Such distributed systems may be themselves interconnected by additional data communications networks.

In the memory subsystem 40 is stored data 60 and computer program code 50 executable by the CPU 10. The program code 50 includes operating system software 90 and application software 80. The operating system software 90, when executed by the CPU 10, provides a platform on which the application software 80 can be executed.

Figure 2:
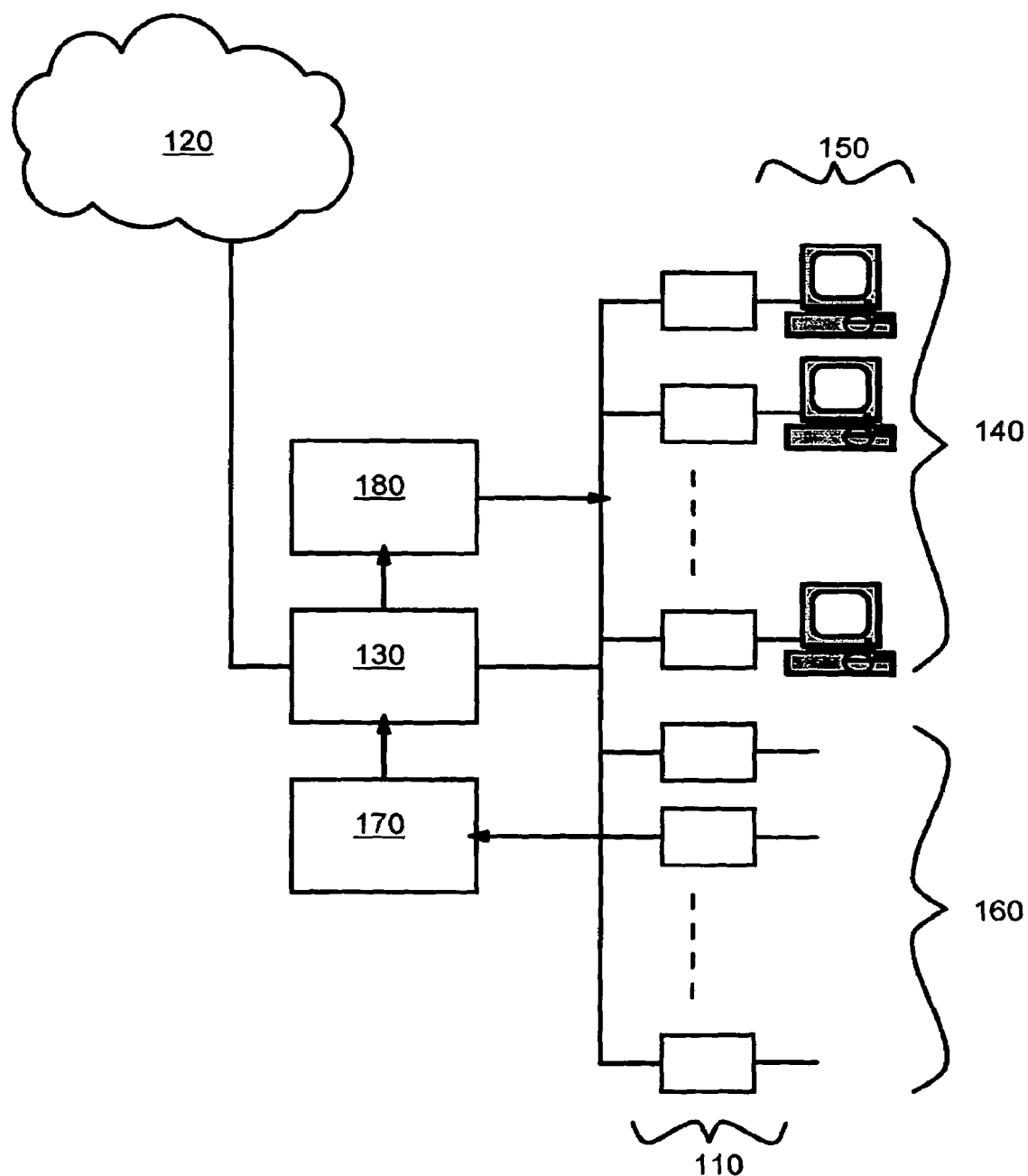
FIG. 2 is a block diagram of a data processing network embodying the present invention.

Referring now to FIG. 2, in a preferred embodiment of the present invention, there is provided a data communications network 100 having a plurality of addresses 110 for assignment to data processing systems in the network. In a particularly preferred embodiment of the present invention, the network 100 is in the form of an Internet service installation having a plurality of assignable Internet Protocol (IP) addresses 110. The network 100 is connected to the Internet 120 via a router 130. The router 130 may be implemented in form of a data processing system as herein before described with reference to FIG. 1 dedicated by appropriate programming to the task to route communication traffic in the form of data packets between the Internet 120 and the network 100 based on IP address data specified in the data packets. A first group 140 of the IP addresses 110 on the network 100 are assigned to systems 150 belonging to users of the Internet service. Each system 150 may be a data processing system as herein before described with reference to FIG. 1. A second group 160 of the IP addresses 110 on the network 100 are free. More specifically, the second group 160 of IP addresses 110 are not assigned to user systems 150. An intrusion detection sensor (IDS) 170 is also connected to the network 100. The IDS 170 is also connected to the router 130. Details of the IDS 170 will be provided further below. The router 130 is connected to a disinfection server 180. The disinfection server 180 may be implemented by a data processing system as herein before described with reference to FIG. 1.

Figure 3:
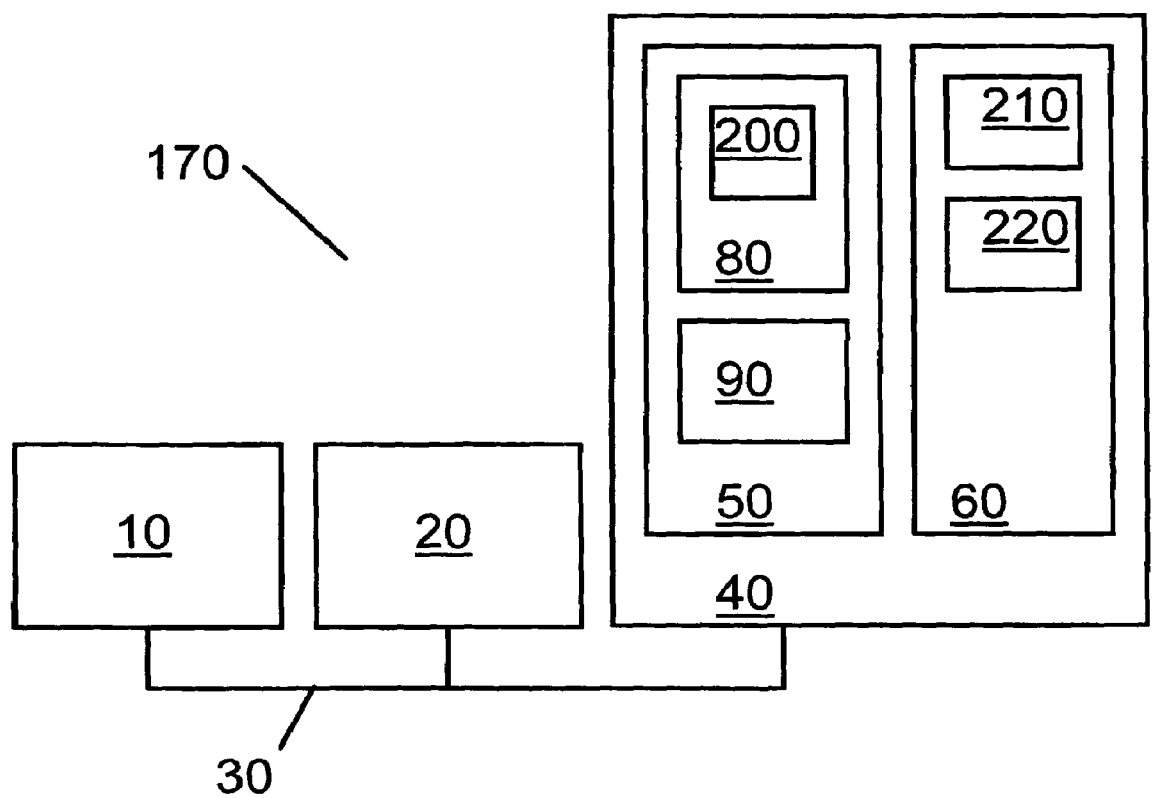
FIG. 3 is a block diagram of an intrusion detection sensor embodying the present invention; and, FIG. 4 is a flow diagram associated with the intrusion detection sensor.

With reference to FIG. 3, in a particularly preferred embodiment of the present invention, the IDS 170 comprises a data processing system as herein before described with reference to FIG. 1. The application software 80 of the IDS 170 includes intrusion detection code 200. The data 60 stored in the memory subsystem 40 of the IDS 170 includes attack identity data 210 and disinfection data 220. The data 60 also includes a record of which of the IP addresses on the network 100 are free and belong to the second group 160, and which of the IP of the IP addresses 110 on the network 100 are assigned to data processing systems 150 and belong to the first group 140. The record is updated each time another IP address is allocated or an existing IP address allocation is removed. The attack identity data 210 contains data indicative of signatures identifying known attacks. The disinfection data 220 contains data indicative of: the nature of each attack; how to disinfect a system infected with each attack; and how to resume normal network connectivity. The attack identity data 210 and disinfection data 220 are cross referenced. The intrusion detection code 200, when executed by the CPU 10, configures the IDS 170 to operate in accordance with the flow diagram shown in FIG. 4.

Figure 4:
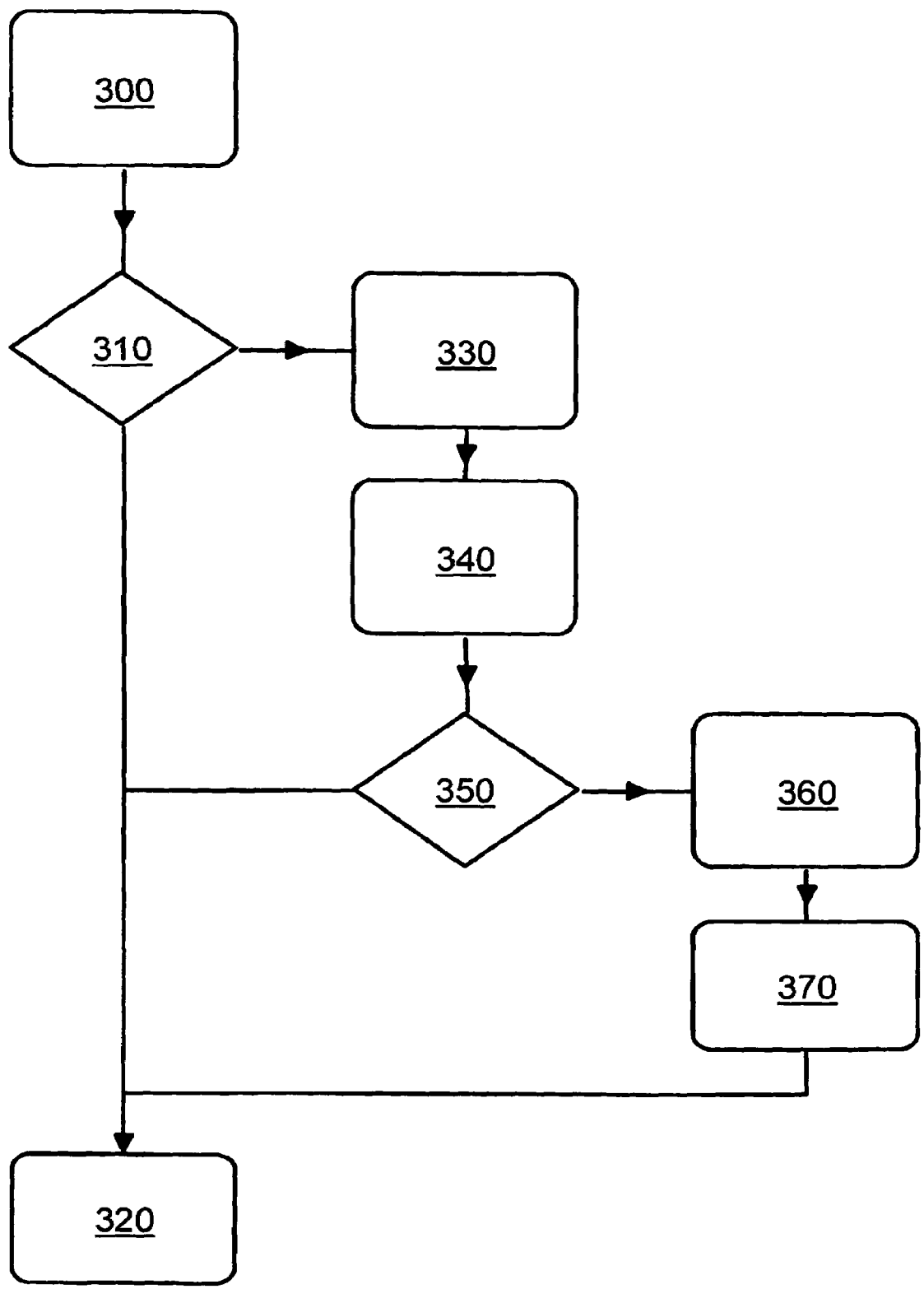

Referring now to FIG. 4, in operation, the IDS 170 identifies data traffic on the network 100 originating at any assigned address 140 and addressed to any unassigned address 160. The IDS 170 inspects any data traffic so identified for data indicative of an attack. On detection of data indicative of attack, the IDS 170 generates an alert signal. In a preferred embodiment of the present invention, on generation of the alert signal, any data traffic originating at the address 140 assigned to the data processing system 150 originating the data indicative of the attack is rerouted to a disinfection address on the network 100. In a particularly preferred embodiment of the present invention, the IDS 170 listens on the network 100 for traffic directed toward the free IP addresses 160. Specifically, at block 300, the IDS 170 examines requests sent from addresses 140 on the network 100 to determine, at block 310, if the request specifies one of the free IP addresses 160 as the destination address. If the request does not specify one of the free IP addresses 160, then, at block 320, the IDS 170 waits for the next request to examine.

The identification may also be realized by assigning the unassigned addresses to the IDS 170, such that any traffic directed at an unassigned address automatically arrives at the IDS 170.

If, however, the request specifies one of the free IP addresses 160, then, at block 330, the IDS 170 spoofs an answer to the request. The answer is sent to the source IP address on the network 100. The free IP addresses 160 are not in use. Thus, any attempt to contact, for example, a system at such an address is a priori suspicious. At block 340, the IDS 170 listens for a reply to the spoofed answer. The IDS 170 may time out if no reply is received within a predetermined period, in which case, at block 320, the IDS 170 waits for the next request to examine. If a reply is however received, then, at block 350, the IDS 170 compares the suspect request and reply with the attack identity data 210 stored in the memory subsystem 40. If, at block 350, the comparison fails to identify an attack, then, at block 320, the IDS 170 waits for the next request to examine. If, however, the comparison at block 350 detects a diagnosable attack in the reply, then the IDS 170 determines that the source system 150 is infected. Accordingly, at block 360, the IDS 170 generates the alert signal. The alert signal is sent to the router 130. The alert signal instructs the router 130 to divert all traffic from the infected system 150 to the disinfection address. Referring back to FIG. 1, in a particularly preferred embodiment of the present invention, a disinfection server 180 is located at the disinfection address.

In a preferred embodiment of the present invention, on generation of the alert signal, the IDS 170 sends an alert message to the disinfection address. Preferably, the alert message comprises data indicative of the attack detected. Accordingly, in a particularly preferred embodiment of the present invention, the IDS 170 retrieves the disinfection data 220 corresponding to the attack detected from the memory subsystem 40. At block 370, the IDS 170 sends the alert message containing retrieved disinfection data to the disinfection address at which the disinfection server 180 resides. Then, at block 320, the IDS 170 waits for the next request to examine. Each request, answer, and reply may be embodied in one or more packets of data traffic on the network 100. Accordingly, the signature of each attack may span more than one packet.

In a preferred embodiment of the present invention, the disinfection data 220 sent to the disinfection server 180 contains data indicative of: the nature of the attack detected; how to disinfect the system 150 infected with the attack; and how to resume normal network connectivity. On receipt of the disinfection data 220 from the IDS 170, the disinfection server 180 sets about curing the infected system 150 and restoring the network 100. In another preferred embodiment of the present invention, the disinfection data 220 contains only data indicative of the nature of the attack. The disinfection server then selects, based the nature of the attack, one of a plurality of pre-stored techniques for disinfecting the infected system 150 and/or restoring the network 100 and executes the selected technique. The attacks may take many different forms. Accordingly, the corresponding techniques for disinfection and network restoration may vary widely from one attack to the next.

In a preferred embodiment of the present invention, on receipt the disinfection data, the disinfection server 180 sends a warning message to the infected system 150. The warning message informs the user of the infected system 150 that his or her system 150 is infected. The message may instruct the user to run anti-virus software pre-stored in the infected system 150 to eliminate or otherwise isolate the infection. Alternatively, the message may contain disinfection program code for eliminating the attack from the infected system 150, together with instructions to assist the user in executing the disinfection code on the infected system 150. In another alternative, the message may direct the user to another web site, at which appropriate disinfection program code is provided. In another preferred embodiment of the present invention, the message contains disinfection program code that, when loaded into the infected system, executes automatically, thus eliminating or otherwise isolating the infection in a manner which is transparent to the user. Other disinfection schemes are possible.

In the embodiments of the present invention herein before described, the disinfection server 180 is implemented in a single data processing system such as that herein before described with reference to FIG. 1. However, in other embodiments of the present invention, the disinfection server 180 may be implemented by multiple interconnected data processing systems. Such data processing may be distributed or located together in a "farm". Each data processing system in the disinfection server may be dedicated to handling a different attack. The IDS 170 may also be implemented by multiple integrated data processing systems. Alternatively, the IDS 170 and the disinfection server 180 may be integrated in a single data processing system.

The traffic on the network 100 sent from the infected system 150 and deflected by the router 130 to the disinfection server 180 may be logged and/or discarded by the disinfection server 180. In the embodiments of the present invention herein before described, the IDS 170 sends disinfection data to the disinfection server 220. However, in other embodiments of the present invention, once an infection is detected, the IDS 170 may simply instruct the router 130 to deflect traffic from the infected system 150 to the disinfection server 180 without the IDS 170 additionally supplying disinfection data 220 to the disinfection server 180. The disinfection server 180 may then simply act as a repository for traffic originating in the infected system 150, logging and/or discarding traffic it receives from the infected system 150. The logging and discarding may be reported by the disinfection server 180 to an administrator of the network 100. Such reports may be delivered periodically or in real time. The reporting may be performed via, for example, an administration console. However, other reporting techniques, such as printed output for example, are possible. On receipt of such reports, administrators can take actions appropriate for eliminating or otherwise containing the infection of the network 100.

In the embodiments of the present invention herein before described, the IDS 170, router 130, and disinfection server 180 are implemented by data processing systems programmed with appropriate program code. However, it will be appreciated that, in other embodiments of the present invention, one or more of the functions described herein as being implemented in software may be implemented at least partially in hardwired logic circuitry.

It will also be appreciated that the attack detection methods described herein may be implemented by the service provider responsible for the network 100, or at least partially by a third party in the form of a service to the service provider. Such a service may differentiate the service offered by the service provider from the services provided by it competitors.

Such differentiated services may be optionally supplied to end users of the network service provided in exchange for an additional premium.

The service of detecting attacks for networks used by an entity other than the service provider, may in a preferred embodiment comprise billing for the service delivered. The charge to be billed may therein be determined in dependence of one or more of a number of factors that typically are indicative of the complexity or workload experienced by the service provider. Such factors indicative of volume and time-consumption of the service provided may include the size of the network, the number of unassigned addresses monitored, the number of assigned addresses monitored, the volume of data traffic inspected, the number of attacks identified, the number of alerts generated, the volume of rerouted data traffic. Factors identifying a level of increased complexity can be the signature of the identified attack, the degree of network security achieved. Also factors identifying the value of the service provided to the serviced entity may be used such as the turnover of said entity, the field of business of said entity, or the like.

Of course, any combination of the previously mentioned factors is possible, in particular being differently weighed to determine a final charge. The billing can be automated in that the charge is sent together with one of the messages sent in the attack detection process. This advantageously combines the use of the messaging for the attack-handling purpose together with its use for the billing purpose. The double use of a message provides the technical advantage of reducing the traffic flow generated through the attack detection and billing process. At the same time this method can be used to guarantee that the serviced entity is only billed for exactly the service provided.

Another preferred solution for billing is offering the entity a subscription to the attack detection service that allows the serviced entity to profit from the attack detection process for a predetermined time, volume of traffic, number of systems or the like. The service provider may offer his own disinfection server as a hosting unit to be used in combination with the network used by the serviced entity, but it is also possible that the disinfection server is held, maintained, hosted or leased by the serviced entity.

In a further preferred embodiment the service provider may utilize a synergistic effect by providing the attack detection service to several entities, and sharing the resources, such as the router 130, intrusion detection sensor 170 and disinfection server 180 among the several services. Thereby not only more efficient use of the employed resources can be obtained but also attack-related information between the different networks can be shared and could be utilized to improve the detection quality on the serviced networks. For instance the detection of an attack on one network could lead to a quicker detection on another network since the process of determining an attack signature can be shortened or even eliminated. Also the disinfection mechanism can be shared between the serviced entities thereby reducing their effort and costs related to updating and maintaining the disinfection mechanism. The technical advantage of sharing technical data that is derived from the handling of attacks to the network of one entity to improve the attack handling of another serviced entity will provide an incentive for entities to join a pool of several entities being serviced by the same service provider for intrusion detection. The billing model could in a preferred embodiment be adapted to incent the participation of entities in a group of entities sharing the detection resources and employing the same service provider.

Herein the term "connect" is not limited to physical connections. It is for example intended to also encompass a general link that allows the sending or receiving of information. The connection can therein be indirect.

The invention claimed is:

1. A method for detecting attacks on a data communications network having a plurality of addresses for assignment to data processing systems in the network, the method comprising:
    using an intrusion detection sensor apparatus for:
    receiving data traffic on the data communications network;
    storing an assigned address and unassigned address records, said unassigned address comprising an address which is free and not assigned to any data processing system on said data communications network; and
    identifying the data traffic originating at any assigned address and addressed to any unassigned address, by comparing the data traffic destination address to said address table;
    using a router operably coupled with the intrusion detection sensor for automatically routing the data traffic addressed to the unassigned address to a physical device for intrusion detection on which said method operates;
    using the intrusion detection sensor for:
    inspecting the data traffic so identified for known data signatures indicative of an attack, wherein the attack spans more than one packet;
    on detection of the known data signatures indicative of said attack, sending an alert message to a disinfection address on the data communications network, wherein said alert message comprises attack identity data;
    using a disinfection server assigned to the disinfection address for sending, upon receipt of the alert message, a warning message to the address assigned to a data processing system originating the data signatures indicative of the attack, wherein said warning message comprises program code for eliminating the attack when executed by the data processing system; and
    billing said entity for the execution of at least one of the foregoing steps, the charge being billed being determined in dependence of at least one of: a size of the network, the number of unassigned addresses monitored, the number of assigned addresses monitored, a volume of data traffic inspected, a number of attacks identified, a number of alerts generated, a signature of the identified attack, a volume of rerouted data traffic, a degree of network security achieved, and a turnover of said entity.

2. A method as claimed in claim 1, further comprising spoofing replies to requests contained in the data traffic identified as originating at any assigned address and addressed to any unassigned address.

3. A system for detecting attacks on a data communications network having a plurality of addresses for assignment to data processing systems in the network, the apparatus comprising:
    an intrusion detection sensor for:
    receiving data traffic on the data communications network;
    storing assigned address and unassigned address records, said unassigned address comprising an address which is free and not assigned to any data processing system on said data communications network;
    identifying the data traffic originating at any assigned address and addressed to any unassigned address by comparing the data traffic destination address to said address with the unassigned address records;
    inspecting the data traffic so identified for known data signatures indicative of an attack, wherein the attack spans more than one packet;
    on detection of the known data signatures indicative of the attack, sending the alert signal to a disinfection address on the data communications network; and
    sending an alert message comprising data indicative of the attack detected to the disinfection address, wherein said alert message comprises attack identity data;
    a router operably coupled with the intrusion detection sensor for automatically routing the data traffic addressed to the unassigned address to a physical device for intrusion detection;

a disinfection server assigned to the disinfection address for sending, upon receipt of the alert message, a warning message to the address assigned to a data processing system originating the data signatures indicative of the attack, wherein said warning message comprises program code for eliminating the attack when executed by the data processing system; and billing said entity for the execution of at least one of the foregoing steps, the charge being billed being determined in dependence of at least one of: a size of the network, the number of unassigned addresses monitored, the number of assigned addresses monitored, a volume of data traffic inspected, a number of attacks identified, a number of alerts generated, a signature of the identified attack, a volume of rerouted data traffic, a degree of network security achieved, and a turnover of said entity.

4. The system as claimed in claim 3, wherein the intrusion detection sensor in use inspects the data traffic identified by spoofing replies to requests contained in the data traffic identified.

5. A data communications network comprising:
a plurality of addresses for assignment to data processing systems in the network;
and, apparatus for detecting attacks on the network as claimed in claim 3.

6. A method as claimed in claim 1, further comprising supporting an entity in the handling of the detected attack by one of providing instructions for use of, assistance in executing, and execution of disinfection program code.

7. A method as claimed in claim 1, further comprising providing a report to said entity containing information related to one of alert, disinfection, rerouting, logging, discarding of data traffic in the context of a detected attack.

8. A method as claimed in claim 1, further comprising providing said method for several network entities and using technical data derived from the attack-handling for one of said network entities for the attack-handling for another of said network entities.

9. A computer program product comprising a non-transitory computer usable medium having computer readable program code embodied therein for causing detection of attacks on a data communications network having a plurality of addresses for assignment to data processing systems in the network, the computer readable program code in said computer program product comprising computer readable program code for causing a computer to perform steps of:

using a central processing unit as an intrusion detection sensor for:
receiving data traffic on the data communications network;
storing an address table containing assigned address and unassigned address records, said unassigned address comprising an address which is free and not assigned to any data processing system on said data communications network;
and identifying the data traffic originating at any assigned address and addressed to any unassigned address, by comparing the data traffic destination address to said address table;
using a router operably coupled with the intrusion detection sensor for automatically routing the data traffic addressed to the unassigned address to a physical device for intrusion detection on which said method operates;
using the intrusion detection sensor for:
inspecting the data traffic so identified for known data signatures indicative of an attack, wherein the attack spans more than one packet;
on detection of the known data signatures indicative of said attack, sending an alert message to a disinfection address on the data communications network, wherein said alert message comprises attack identity data;
using a disinfection server assigned to the disinfection address for sending, upon receipt of the alert message, a warning message to the address assigned to a data processing system originating the data signatures indicative of the attack, wherein said warning message comprises program code for eliminating the attack when executed by the data processing system; and
billing said entity for execution of at least one of the foregoing steps, the charge being billed being determined in dependence of at least one of: a size of the network, the number of unassigned addresses monitored, the number of assigned addresses monitored, a volume of data traffic inspected, a number of attacks identified, a number of alerts generated, a signature of the identified attack, a volume of rerouted data traffic, a degree of network security achieved, and a turnover of said entity.

* * * * *